United States Patent
Mao et al.

(10) Patent No.: US 10,673,246 B2
(45) Date of Patent: Jun. 2, 2020

(54) SYSTEM AND DEVICE FOR EXPORTING POWER, AND METHOD OF CONFIGURING THEREOF

(71) Applicant: Futurewei Technologies, Inc., Plano, TX (US)

(72) Inventors: Xiaolin Mao, Plano, TX (US); Heping Dai, Plano, TX (US); Dianbo Fu, Frisco, TX (US); Huibin Zhu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 15/829,846

(22) Filed: Dec. 1, 2017

(65) Prior Publication Data

US 2019/0148947 A1 May 16, 2019

Related U.S. Application Data

(60) Provisional application No. 62/585,263, filed on Nov. 13, 2017.

(51) Int. Cl.
| | |
|---|---|
| *H02J 3/38* | (2006.01) |
| *G05F 1/67* | (2006.01) |
| *H02M 7/487* | (2007.01) |
| *H02M 1/00* | (2006.01) |
| *H02M 3/158* | (2006.01) |

(Continued)

(52) U.S. Cl.
CPC ............... *H02J 3/385* (2013.01); *G05F 1/67* (2013.01); *H02M 3/158* (2013.01); *H02M 3/1582* (2013.01); *H02M 3/1588* (2013.01); *H02M 7/487* (2013.01); *H02M 7/49* (2013.01); *H02M 7/5387* (2013.01); *H02M 2001/007* (2013.01)

(58) Field of Classification Search
CPC ..... H02J 3/385; H02M 3/1588; H02M 7/5387
USPC .......................................................... 307/78
See application file for complete search history.

(56) References Cited

U.S. PATENT DOCUMENTS

| | | | |
|---|---|---|---|
| 8,772,965 B2* | 7/2014 | El-Barbari | H02J 3/383 307/71 |
| 2008/0150366 A1* | 6/2008 | Adest | H02M 3/1582 307/77 |

(Continued)

FOREIGN PATENT DOCUMENTS

| | | |
|---|---|---|
| EP | 2518855 A2 | 10/2012 |
| EP | 3026776 A1 | 6/2016 |

*Primary Examiner* — Carlos Amaya
(74) *Attorney, Agent, or Firm* — Slater Matsil, LLP

(57) ABSTRACT

System, device and method for exporting power are provided including at least one AC optimizer with plurality of DC inputs each connecting with respective one of plurality of DC sources, and independent maximum power point tracking (MPPT) performed for each respective DC source to extract power from each DC source for output and coupling to AC grid. When multiple AC optimizers are employed, with each AC optimizer having multiple DC inputs, each DC input can be connected to PV module with independent MPPT function. Since, each AC optimizer can serve multiple PV modules, significant cost saving and efficiencies can be achieved. Optionally, on PV sub-module level, each of the multiple DC inputs can be used as an independent MPPT channel for a PV sub-module cell string.

17 Claims, 8 Drawing Sheets

(51) Int. Cl.
  *H02M 7/49*     (2007.01)
  *H02M 7/5387*   (2007.01)

(56) References Cited

U.S. PATENT DOCUMENTS

2009/0020151 A1* 1/2009 Fornage ............... H02M 7/48
                                                  136/248
2017/0324249 A1  11/2017 Cao et al.

* cited by examiner

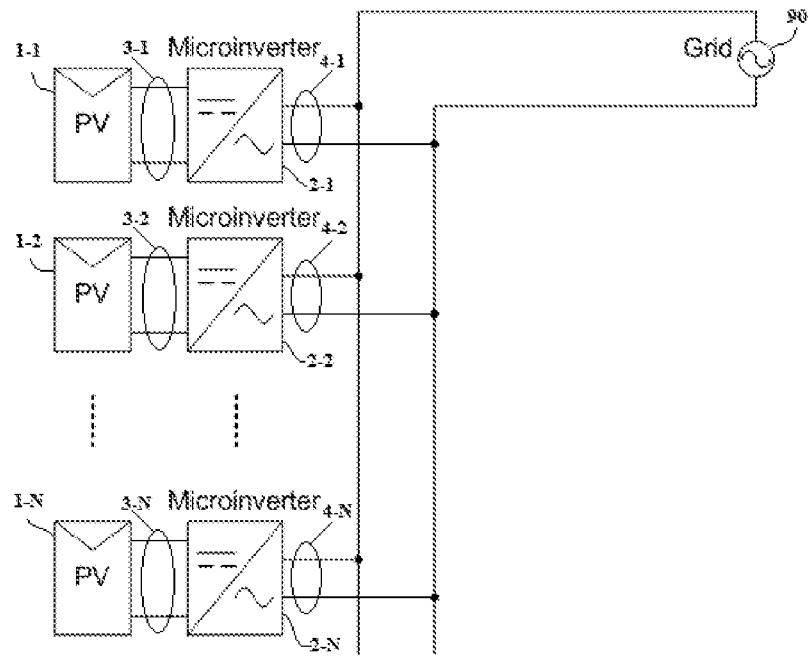
FIG. 1
CONVENTIONAL
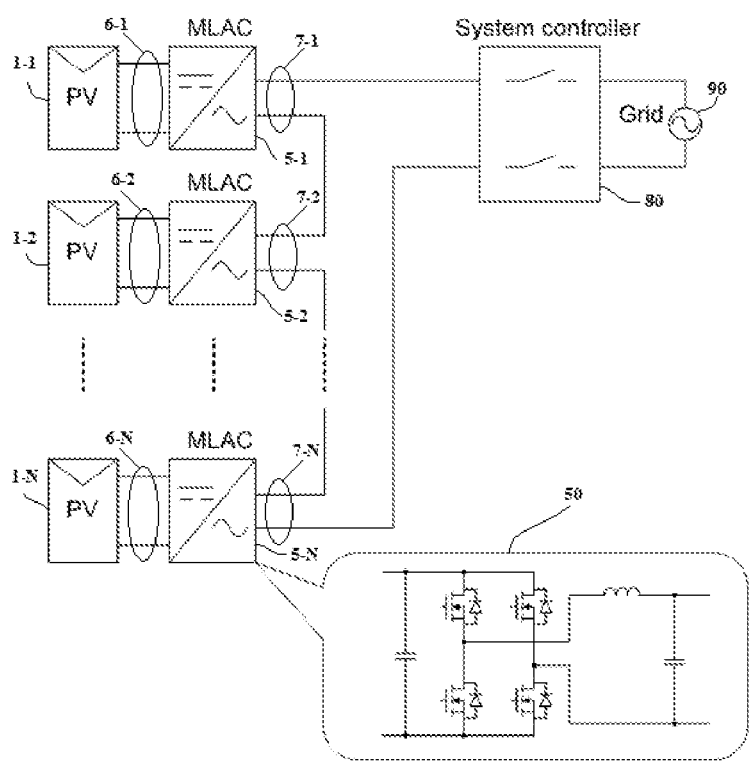
FIG. 2
CONVENTIONAL

SYSTEM AND DEVICE FOR EXPORTING POWER, AND METHOD OF CONFIGURING THEREOF

CROSS-REFERENCE TO RELATED APPLICATIONS

This application claim priority under 35 USC § 119(e) from U.S. Provisional Patent Application No. 62/585,263 filed on Nov. 13, 2017, the contents of which is hereby incorporated by reference in its entirety.

TECHNICAL FIELD

The present disclosure relates to solar inverters, solar power optimizers, and distributed photovoltaic (PV) systems, and methods of configuring thereof.

BACKGROUND

Distributed PV systems can be either based on DC-DC power optimizers or on DC-AC power optimizers. A DC-AC power optimizer, or in short, AC optimizer, performs maximum power point tracking (MPPT) for each PV module, which is a packaged, connected assembly of plurality of solar cells, and converts DC power to low voltage AC power. The AC outputs of multiple AC optimizers are then connected in series to match the AC voltage of the grid to be able to export power to the grid.

An example of a conventional architecture illustrated in FIG. 1 shows multiple PV modules 1-1, 1-2, . . . 1-N each connected to inputs 3-1, 3-2, . . . 3-N of respective microinverters 2-1, 2-2, . . . 2-N whose respective outputs 4-1, 4-2, . . . 4-N are then connected in parallel. In such microinverter architecture, each microinverter has an AC output voltage of the full grid voltage, and thus requires high voltage devices, which leads to high cost and low efficiency. Also, each microinverter has a high step-up ratio, which leads to low efficiency.

It is noted that throughout the description and drawings, reference "N" means an integer greater than zero to illustrate that any number of elements 1 to N are within the scope of the disclosure. Likewise, numerical terms used to describe system components, such as "first" component and "second" component, which may appear in the description or appended claims, are non-liming descriptive terms for clarity of understanding.

Another example of a conventional architecture illustrated in FIG. 2 shows multiple PV modules 1-1, 1-2, . . . 1-N each connected to respectively inputs 6-1, 6-2, . . . 6-N of respective AC optimizer, module-level inverter (MLAC), 5-1, 5-2, . . . 5-N whose respective outputs 7-1, 7-2, . . . 7-N are then connected in series to a system controller 80, which is connected to the voltage of grid 90. In each MLAC, a standard full-bridge inverter 50 is used for DC/AC power conversion. As can be seen, conventional AC optimizer technologies use an AC optimizer for each PV module adding expense due to, for example, number of components and connections needed for such implementations.

SUMMARY

Illustrative embodiments of the disclosure address at least the above problems and/or disadvantages, and provide at least the advantages described below.

According to one aspect of the present disclosure there is provided a system that includes: plurality of DC sources, at least one AC optimizer, for example a multi-input AC optimizer (MILVAC), having a plurality of DC inputs and an AC output, each of the DC inputs connected to a respective one of the plurality of DC sources, performing independent maximum power point tracking (MPPT) for each of the respective DC sources connected to the DC inputs to extract power from each of the DC sources, and output an AC voltage at the AC output; and a system controller receiving input from the at least one AC optimizer, and controlling AC output to an AC grid.

Optionally, in any of the aspects of the disclosure: a plurality of AC optimizers each including a plurality of DC inputs and an AC output, each DC input of each AC optimizer is connected to a respective one of the plurality of DC sources, and performing independent MPPT for each of the respective DC sources connected to its DC inputs to extract power from each of the DC sources and output an AC voltage at the AC output of each AC optimizer. The AC outputs of the plurality of AC optimizers are connected in series, the system controller receiving the series-connected AC output.

Optionally, in any of the aspects of the disclosure, at least one of the plurality of the DC sources includes a PV module, and/or a PV sub-module cell string.

According to another aspect of the present disclosure there is provided a method that includes: connecting a plurality of DC sources to two or more AC optimizers each of the AC optimizers having a plurality of DC inputs and an AC output, each of the DC inputs being connected to a respective one of the plurality of DC sources, performing independent MPPT for each of the respective DC sources connected to the DC inputs to extract power from each of the DC sources; and coupling optimized AC power from the two or more AC optimizer connected in series to an AC grid.

According to yet another aspect of the present disclosure there is provided a device that includes: a plurality of DC inputs, each of the DC inputs connecting to one DC source of a plurality of DC sources, a circuit performing independent MPPT for each of the DC sources connected to the DC inputs to extract power from each of the DC sources and generate an AC voltage at its AC voltage output, the circuit performing independent MPPT includes: a first DC/DC converter having a first DC/DC input and a first DC/DC output, at least one of the DC inputs is coupled with the first DC/DC input; a second DC/DC converter having a second DC/DC input and a second DC/DC output, at least another of the DC inputs is coupled with the second DC/DC input; and an inverter having an inverter input coupled to the first DC/DC output and the second DC/DC output connected in series, and an inverter output connected to the AC output.

Optionally, in any of the preceding aspects, a circuit performing independent MPPT includes: a filter, the first and second DC/DC converters being a step-down DC-to-DC converters whose outputs are connected in series to share the filter before coupling to the inverter input.

Optionally, in any of the preceding aspects, a circuit performing independent MPPT includes: a plurality of inverters each having an inverter input and an inverter output, each DC input being coupled with the respective inverter input, the plurality of the inverters are cascaded followed by a filter, before connecting to the AC output.

Optionally, in the preceding aspects, a circuit performing independent MPPT includes: a DC/DC converter between input of each inverter and its DC input.

BRIEF DESCRIPTION OF THE DRAWINGS

The above and other exemplary features, aspects and advantages of the disclosure will become more apparent from the following detailed description of illustrative embodiments thereof when taken in conjunction with the accompanying drawings in which:

FIG. 1 illustrates an example of a conventional microinverter architecture.

FIG. 2 illustrates an example of a conventional AC optimizer architecture.

DETAILED DESCRIPTION OF ILLUSTRATIVE EMBODIMENTS

This description is provided to assist with a comprehensive understanding of illustrative embodiments with reference to the accompanying drawing figures. Accordingly, those of ordinary skill in the art will recognize that various changes and modifications of the illustrative embodiments described herein can be made within the scope of appended claims without departing from their full scope and equivalents. Also, descriptions of well-known functions and constructions are omitted for clarity and conciseness. Likewise, certain naming conventions, labels and terms as used in the context of the present disclosure are non-limiting and provided only for illustrative purposes to facilitate understanding of exemplary implementations of the illustrative embodiments.

Generally, illustrative embodiments disclose system and method including multiple distributed, optionally low voltage, multi-input AC optimizers (MILVACs or devices) each having multiple DC inputs each connected with its DC source, and a circuit, including hardware and/or software components for performing independent MPPT to extract essentially maximum power from its DC source and generate AC voltage at an AC output of the AC optimizer (MILVAC or device). The AC outputs of the multiple AC optimizers can be connected in series before coupling to a system controller, or ultimately to an AC grid. Benefits resulting from such systems and methods include, for example and without limitation, cost savings compared to single one-to-one input AC optimizer architecture due to use of less AC connectors, reduction in AC filter size afforded by a multi-level topology, and cost reduction in parts whose costs do not scale proportionally with power, such as enclosure, sensing and controller circuitry, gate drivers, relays. Another exemplary non-limiting benefit is higher efficiency due to a more flexible topology choice, especially multi-level topology that reduces AC filter size.

Figure 3:
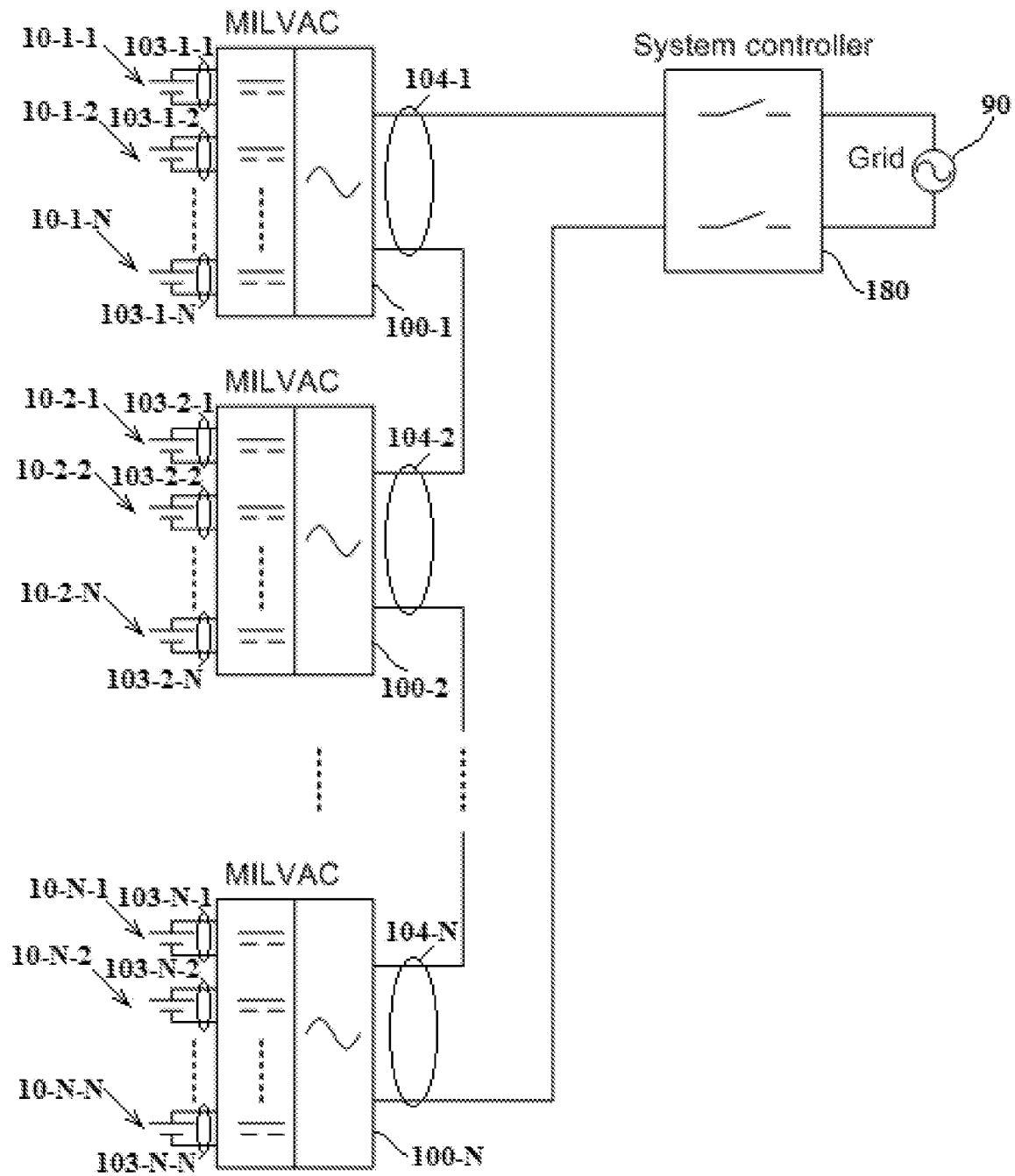
FIG. 3 illustrates an example of multi-input AC optimizer (MILVAC) architecture according to illustrative embodiments of disclosure.

According to illustrative embodiments of the disclosure, in a distributed system, each AC optimizer (MILVAC or device) has multiple DC inputs and each DC input can be connected to a DC source and provided with an independent MPPT function. This can result in significant cost saving. Referring to FIG. 3, each of MILVACs 100-1 to 100-N has multiple DC inputs: MILVAC 100-1 has multiple inputs 103-1-1, 103-1-2, . . . 103-1-N each connected to a respective one of DC sources 10-1-1, 10-1-2, . . . 10-1-N; MILVAC 100-2 has multiple inputs 103-2-1, 103-2-2, . . . 103-2-N each connected to a respective one of DC sources 10-2-1, 10-2-2, . . . 10-N-2; and so on as diagrammatically illustrated by a MILVAC 100-N with multiple inputs 103-N-1, 103-N-2, . . . 103-N-N each connected to a respective one of DC sources 10-N-1, 10-N-2, . . . 10-N-N. Each MILVAC 100-1 to 100-N extracts power from the respective DC sources connected thereto, and outputs an AC voltage at its AC output: MILVAC 100-1 has an AC output 104-1; MILVAC 100-2 has an AC output 104-2; and so on to MILVAC 100-N with an AC output 104-N. The outputs 104-1 to 104-N of MILVACS 100-1 to 100-N are connected in series as input to system controller 180, which is connected to grid 90.

Figure 4A:
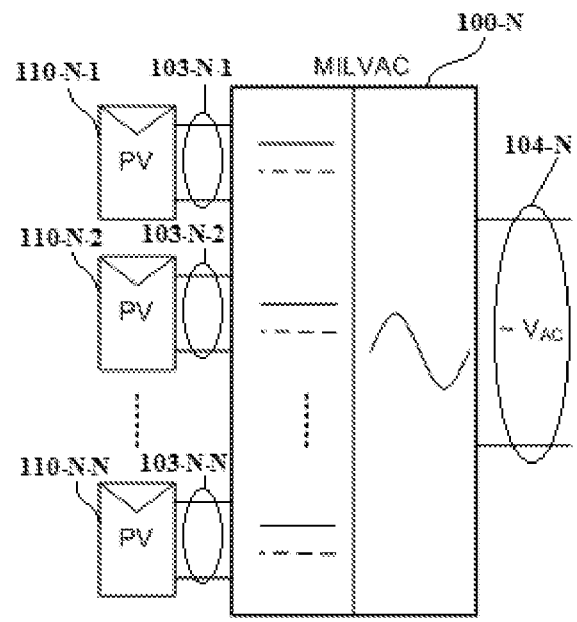
FIG. 4A illustrates an example of AC optimizer (MILVAC) architecture application with multiple PV module inputs according to illustrative embodiments of disclosure.
Figure 4B:
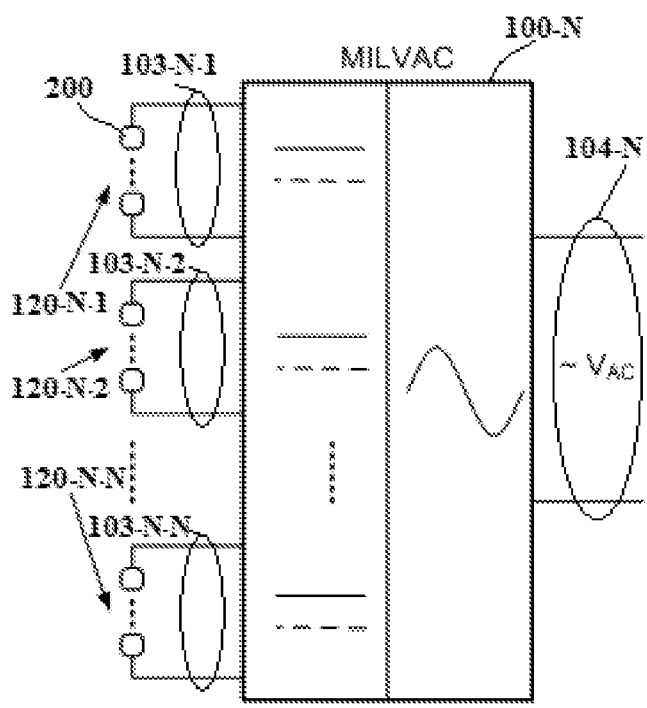
FIG. 4B illustrates an example of AC optimizer (MILVAC) architecture application with multiple PV sub-module cell string inputs according to illustrative embodiments of disclosure.

In an illustrative embodiment, as diagrammatically shown in a non-limiting example of FIG. 4A, each DC input of any, one or more, or all of AC optimizers, such as MILVAC 100-1 to 100-N, can be connected to a respective one of individual PV modules 110-N-1, 110-N-2, . . . 110-N-N, for example in a manner of DC sources as illustrated in non-limiting example of FIG. 3. In yet another illustrative embodiment, as diagrammatically shown in a non-limiting example of FIG. 4B, each DC input of any, one or more, or all of AC optimizers, such as MILVAC 100-1 to 100-N, can be connected to a respective one of individual PV sub-module cell strings (also referenced, without any limitation, as "PV cell strings") 120-N-1, 120-N-2, . . . 120-N-N, for example in a manner of DC sources as illustrated in non-limiting example of FIG. 3, each of the PV cell strings 120-N-1, 120-N-2 comprising one or more PV cells 200. Each of the multiple DC inputs 103-N-1, 103-N-2, . . . 103-N-N can be used as an independent MPPT channel for each of the PV cell strings. This can result in significant cost saving.

Figure 5A:
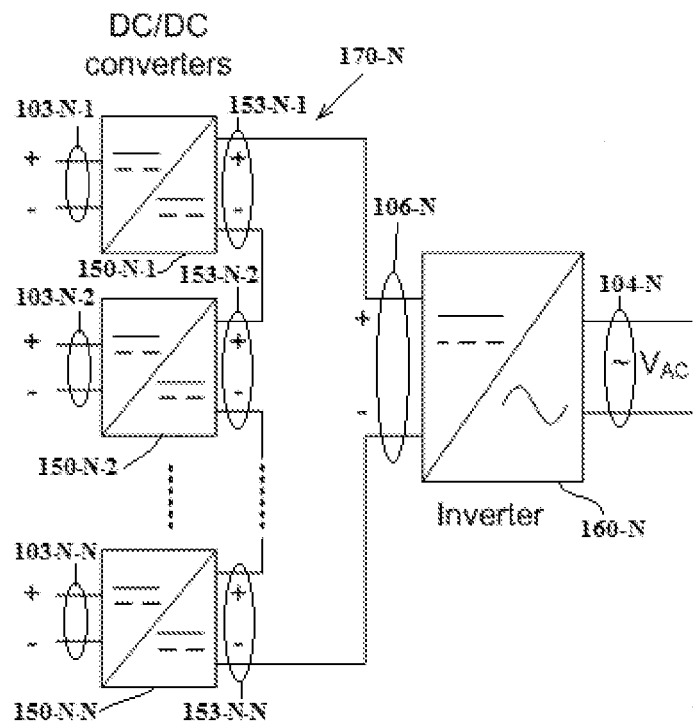
FIG. 5A illustrates an example of AC optimizer (MILVAC) internal configuration according to illustrative embodiments of disclosure.
Figure 5B:
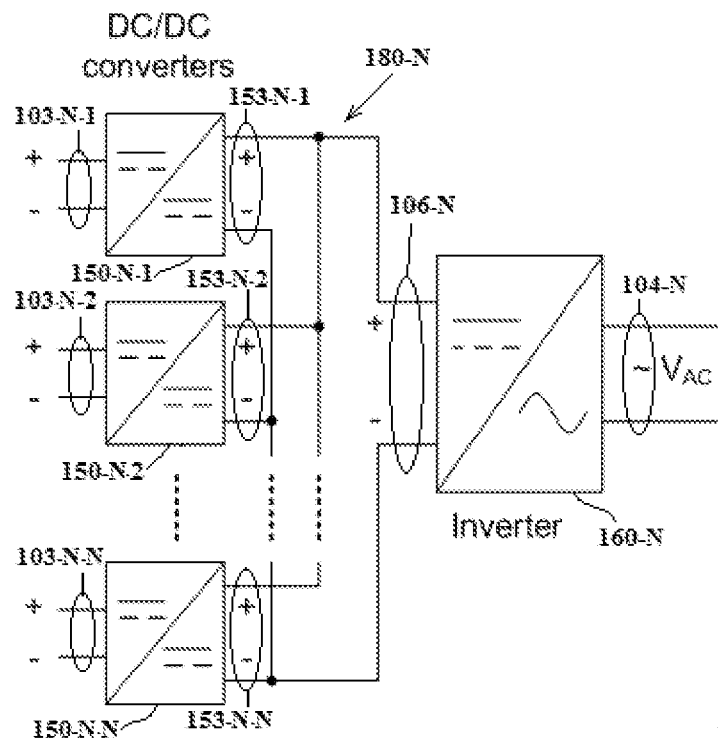
FIG. 5B illustrates an example of AC optimizer (MILVAC) internal configuration according to illustrative embodiments of disclosure.

According to illustrative embodiments, different internal configurations of any one or more, or all, of AC optimizers, such as any MILVAC 100-N, or any one or more, or all, of MILVACs 100-1 to 100-N, which can perform the function of receiving multiple DC inputs and providing an optimized AC output based thereon, are within the scope of the disclosure. In an illustrative embodiment, as diagrammatically shown in a non-limiting example of FIG. 5A, each DC input 103-N-1, 103-N-2, . . . 103-N-N of a MILVAC is coupled with an input of a respective one of DC/DC converters 150-N-1, 150-N-2, . . . 150-N-N, and the respective outputs 153-N-1, 153-N-2, . . . 153-N-N, of all the DC/DC converters 150-N-1, 150-N-2, . . . 150-N-N, are connected in series 170-N before coupling to the input 106-N of an inverter 160-N connected to, or providing, output 104-N of the MILVAC. In another illustrative embodiment, as diagrammatically shown in a non-limiting example of FIG. 5B, each DC input 103-N-1, 103-N-2, . . . 103-N-N of a MILVAC is coupled with an input of a respective DC/DC converter 150-N-1, 150-N-2, . . . 150-N-N, and the respective outputs 153-N-1, 153-N-2, . . . 153-N-N, of all the DC/DC converters 150-N-1, 150-N-2, . . . 150-N-N, are connected in parallel 180-N before coupling to the input 106-N of an inverter 160-N connected to, or providing, output 104-N of the MILVAC.

Figure 6A:
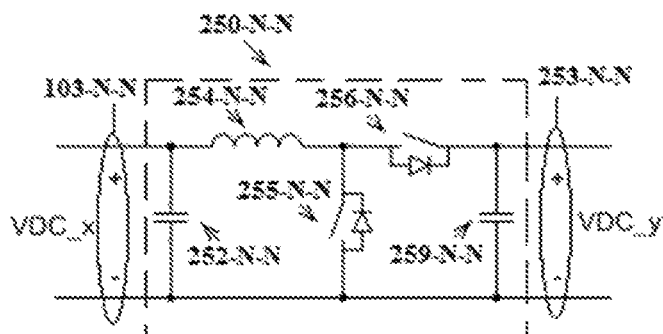
FIG. 6A illustrates an example of DC/DC converter topology according to illustrative embodiments of disclosure.
Figure 6B:
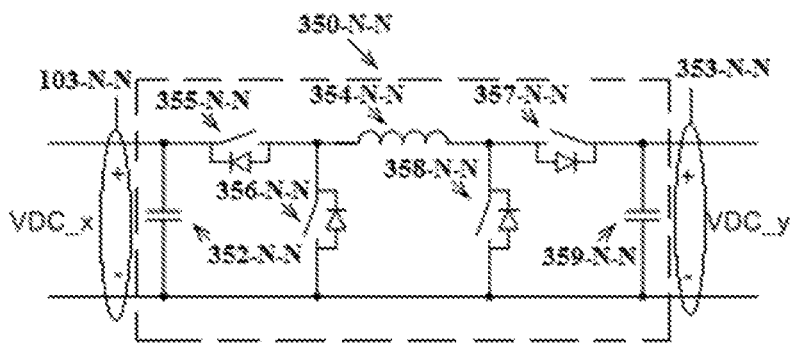
FIG. 6B illustrates an example of DC/DC converter topology according to illustrative embodiments of disclosure.

According to illustrative embodiments, different DC/DC converter topologies, which can perform the function of receiving one or multiple DC inputs and DC/DC conversion, as part of internal configurations of any one or more, or all, of AC optimizers, such as any MILVAC 100-N, or any one or more, or all, of MILVACs 100-1 to 100-N, of a system, are within the scope of the disclosure. In an illustrative embodiment, as diagrammatically shown in a non-limiting example of FIG. 6A, a boost convert (or step-up converter, or a DC-to-DC power converter, whose function is to step up voltage, while stepping down current, from its input to its output) can perform DC/DC conversion function as a DC/DC converter 250-N-N, comprising exemplary circuit components, including an inductor 254-N-N, switches 255-N-N and 256-N-N, and capacitors 252-N-N and 259-N-N, configured as shown in the circuit diagram, receiving DC input 103-N-N and providing DC output 253-N-N. In an exemplary implementation, switch 256-N-N of converter 250-N-N can be a diode. In another illustrative embodiment, as diagrammatically shown in a non-limiting example of FIG. 6B, a combination buck-boost converter (or a type of DC-to-DC converter that function to have an output voltage magnitude that is either greater than or less than the input voltage magnitude) can perform DC/DC conversion function as a DC/DC converter 350-N-N, comprising exemplary circuit components, including an inductor 354-N-N, switches 355-N-N, 356-N-N, 357-N-N, and 358-N-N, and capacitors 352-N-N and 359-N-N, configured as shown in the circuit diagram, receiving DC input 103-N-N and providing DC output 353-N-N. In an exemplary implementation, any one of, or both, switches 356-N-N and 357-N-N of converter 350-N-N can be a diode.

Figure 6C:
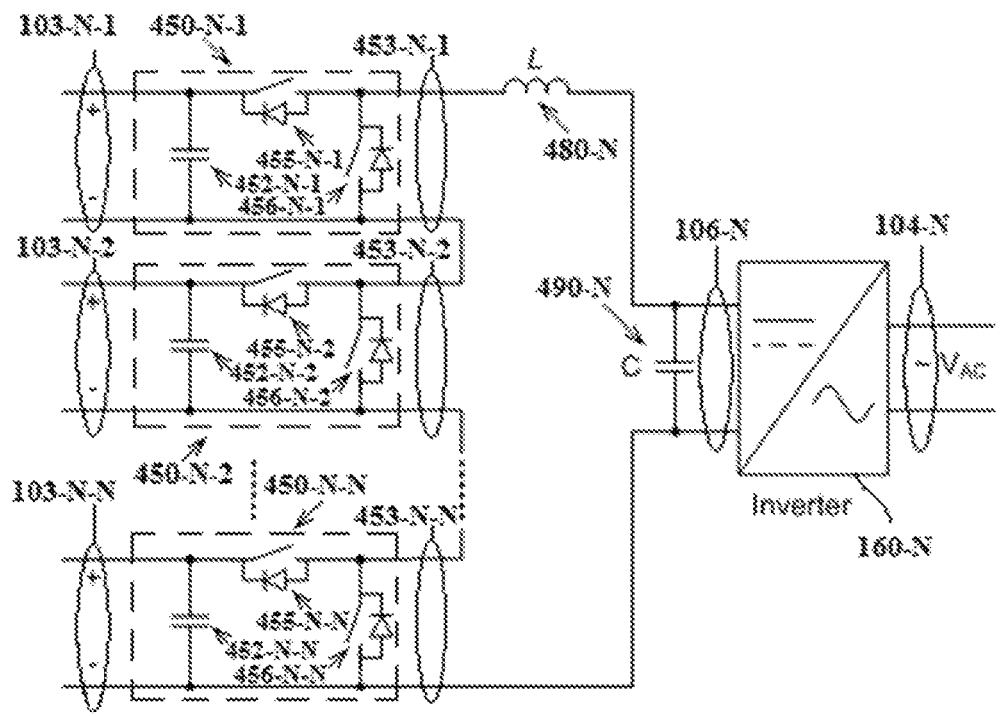
FIG. 6C illustrates an example of DC/DC converter topology according to illustrative embodiments of disclosure.

In yet another illustrative embodiment, another DC/DC converter topology, which can perform the function of receiving multiple DC inputs and DC/DC conversion, as part of internal configurations of any one or more, or all, of AC optimizers, such as any MILVAC 100-N, or any one or more, or all, of MILVACs 100-1 to 100-N, of a system, can include multiple DC/DC converters connected in a series DC/DC configuration where the converters can share a filter, such as an LC filter, before providing input to an inverter. This minimizes the filter size. As shown in a non-limiting example of FIG. 6C, multiple DC/DC converters 450-N-1, 450-N-2, . . . 450-N-N, such as buck converters (or step-down converts, or a DC-to-DC power converter, whose function is to step down voltage, while stepping up current, from its input to its output), comprising respective exemplary circuit components, including switches 455-N-1, 455-N-2, 455-N-N, and 456-N-1, 456-N-2, 456-N-N, and capacitors 452-N-1, 452-N-2, and 452-N-N, configured as shown in the circuit diagram, receiving respective DC inputs 103-N-1, 103-N-2, . . . 103-N-N, can be connected in a series DC/DC configuration to share a filter, such as an LC filter comprising an inductor 480-N and a capacitor 490-N, and providing input 106-N to inverter 160-N.

Figure 7A:
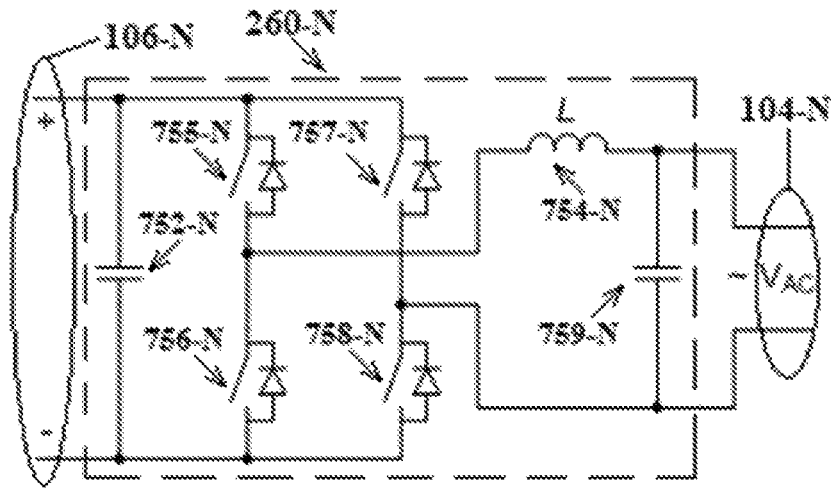
FIG. 7A illustrates an example of inverter topology according to illustrative embodiments of disclosure.
Figure 7B:
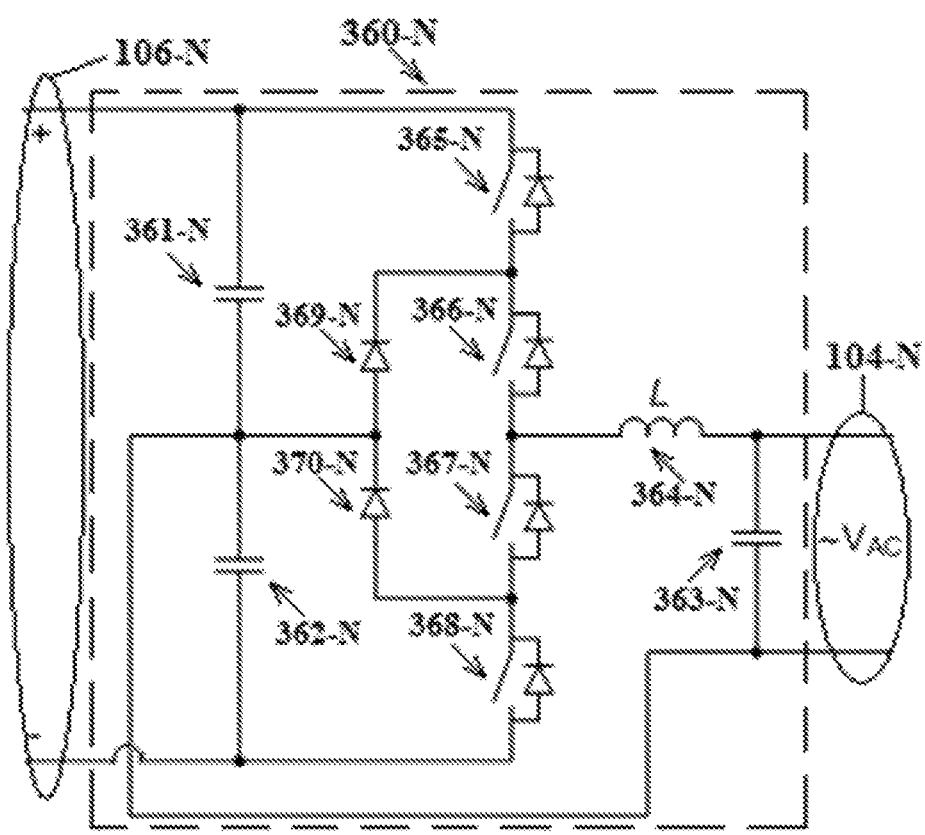
FIG. 7B illustrates an example of inverter topology according to illustrative embodiments of disclosure.

According to illustrative embodiments, different inverter topologies, which can perform the function of receiving output of any of the DC/DC converters of any of the topologies described herein, as part of internal configurations of any one or more, or all, of AC optimizers, such as any MILVAC 100-N, or any one or more, or all, of MILVACs 100-1 to 100-N, of a system, are within the scope of the disclosure. In an illustrative embodiment, as shown in a non-limiting example of FIG. 7A, a full bridge inverter can perform DC/AC inverter function as an inverter 260-N, comprising exemplary circuit components, including an inductor 754-N, switches 755-N, 756-N, 757-N, and 758-N, and capacitors 752-N and 759-N, configured as shown in the circuit diagram, receiving DC input 106-N and providing AC output 104-N. In another illustrative embodiment, as shown in a non-limiting example of FIG. 7B, a diode neutral point clamped three-level half-bridge inverter can perform DC/AC inverter function as an inverter 360-N, comprising exemplary circuit components, including an inductor 364-N, switches 365-N, 366-N, 367-N, and 368-N, capacitors 361-N, 362-N and 363-N, and diodes 369-N and 370-N configured as shown in the circuit diagram, receiving DC input 106-N and providing AC output 104-N.

Figure 8:
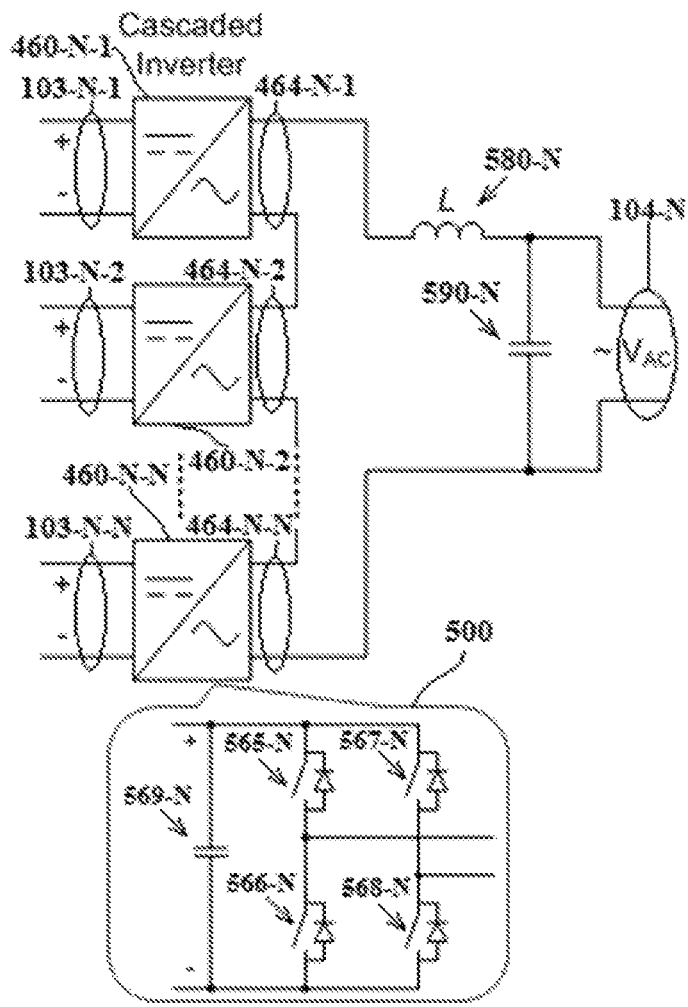
FIG. 8 illustrates an example of AC optimizer (MILVAC) internal configuration according to illustrative embodiments of disclosure.

According to further illustrative embodiments, another internal configuration of any one or more, or all, of AC optimizers, such as any MILVAC 100-N, or any one or more, or all, of MILVACs 100-1 to 100-N, which can perform the function of receiving multiple DC inputs and providing an optimized AC output based thereon, couples each DC input with an input of an inverter (without an AC filter), all the inverters are then cascaded, followed by an AC filter. In an illustrative embodiment, shown in a non-limiting example of FIG. 8, multiple inverters 460-N-1, 460-N-2, . . . 460-N-N receiving respective DC inputs 103-N-1, 103-N-2, . . . 103-N-N, can be connected in a series configuration to share an LC filter comprising an inductor 580-N and a capacitor 590-N, providing AC output 104-N. In an exemplary implementation, any one or more, or all of inverters 460-N-1, 460-N-2, . . . 460-N-N can comprise a full bridge inverter 500 comprising exemplary circuit components, including switches 565-N, 566-N, 567-N, and 568-N and a capacitor 569-N configured as shown in the circuit diagram.

Figure 9:
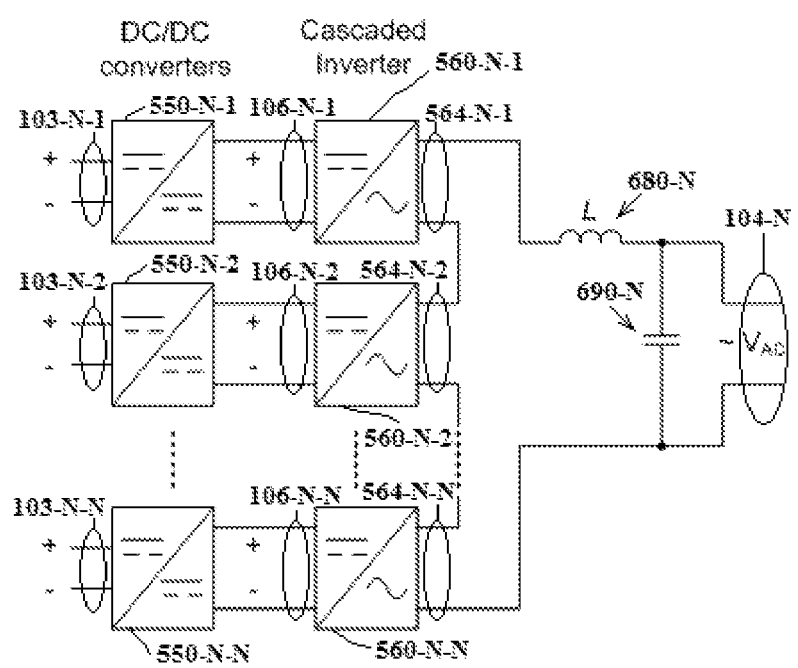
FIG. 9 illustrates an example of AC optimizer (MILVAC) internal configuration according to illustrative embodiments of disclosure.

In another illustrative embodiment, yet another internal configuration of any one or more, or all, of AC optimizers, such as any MILVAC 100-N, or any one or more, or all, of MILVACs 100-1 to 100-N, which can perform the function of receiving multiple DC inputs and providing an optimized AC output based thereon, provides a DC/DC converter between each inverter and its DC input, all the inverters are then cascaded, followed by an AC filter. In an illustrative embodiment, shown in a non-limiting example of FIG. 9, multiple inverters 560-N-1, 560-N-2, . . . 560-N-N receive respective DC inputs 106-N-1, 106-N-2, . . . 106-N-N from respective DC/DC converters 550-N-1, 550-N-2, . . . 550-N-N connected to respective DC inputs 103-N-1, 103-N-2, . . . 103-N-N. Multiple inverters 560-N-1, 560-N-2, . . . 560-N-N are then connected in a series configuration to share an LC filter comprising an inductor 680-N and a capacitor 690-N, providing AC output 104-N.

The cascaded inverters form a multi-level inverter, which results in reduced AC filter size.

Figure 10:
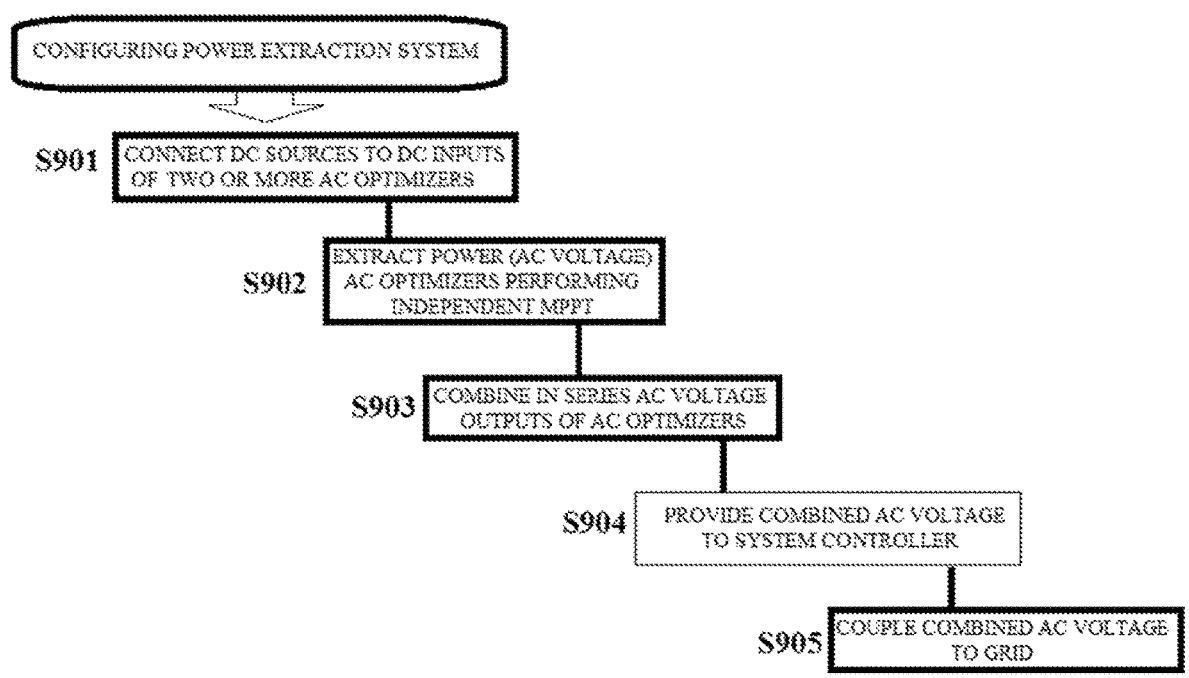
FIG. 10 illustrates in a process diagram an example of configuring a system including multi-input AC optimizer (MILVAC) architecture according to illustrative embodiments of disclosure.

According to yet another illustrative embodiment of the disclosure, a method of configuring a system for exporting power comprises connecting one or more AC optimizers (MILVAC or device), each with multiple DC inputs and optionally having structure and functionality in accordance with any aspects of previously-disclosed illustrative embodiments, to individual DC sources and perform independent MDPT function to extract power from each DC source, and couple the extracted power to a power grid. Referring to example of FIG. 10: in step S901, each of multiple inputs 103-1-1 to 103-N-N of one or more AC optimizers 100-1 to 100-N is connected to respective DC sources 10-1-1 to 10-N-N; in step S902, power is extracted from the respective DC sources 10-1-1 to 10-N-N by respective AC optimizer s100-1 to 100-N, each of which performs independent MPPT to extract power form its DC sources and outputs an AC voltage at its AC output 104-1 to 104-N; in step S903, the outputs 104-1 to 104-N of AC optimizers 100-1 to 100-N are combined (optionally, by connection in series); optionally, in step S904, combined outputs of AC optimizers 100-1 to 100-N are provided as input to system controller 180; and in step S905, the combined outputs of AC optimizers 100-1 to 100-N are coupled to grid 90.

The above-presented description and figures are intended by way of example only and are not intended to limit the illustrative embodiments in any way except as set forth in the appended claims. It is particularly noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments, but may be modified within the scope of appended claims, along with their full scope of equivalents.

What is claimed is:

1. A distributed DC to AC system comprising:
   a plurality of DC sources;
   a first AC optimizer comprising a plurality of first DC inputs, a plurality of DC/DC converters and a first AC output, each of said first DC inputs connected to a respective one of said plurality of DC sources through one of the plurality of DC/DC converters, wherein the first AC optimizer comprises a filter shared by series-connected outputs of the plurality of DC/DC converters;
   a second AC optimizer comprising a plurality of second DC inputs and a second AC output, each of said second DC inputs connected to a respective one of said plurality of DC sources; and
   a system controller receiving input from said first AC optimizer and second AC optimizer, and controlling the first AC output and the second AC output to provide power to an AC grid, wherein each of said first AC optimizer and said second AC optimizer is a multiple-input single-out optimizer, and the first AC output and the second AC output are connected in series and further connected to the AC grid through the system controller.

2. The system of claim 1, wherein
   said plurality of DC sources comprises a plurality of first DC sources and a plurality of second DC sources, and wherein the plurality of first DC sources is connected to the first AC optimizer and the plurality of second DC sources is connected to the second AC optimizer.

3. The system of claim 1, wherein at least one of said plurality of DC sources comprises a PV module.

4. The system of claim 1, wherein at least one of said plurality of DC sources comprises a PV sub-module cell string.

5. The system of claim 1, wherein the plurality of DC/DC converters of said first AC optimizer comprises:
   a first DC/DC converter comprising a first DC/DC input and a first DC/DC output, at least one of said first DC inputs of said first AC optimizer is coupled with said first DC/DC input;
   a second DC/DC converter comprising a second DC/DC input and a second DC/DC output, at least another of said first DC inputs of said first AC optimizer is coupled with said second DC/DC input; and
   an inverter comprising an inverter input coupled to said first DC/DC output and said second DC/DC output.

6. The system of claim 5, wherein said first DC/DC output and said second DC/DC output are connected in series before coupling to said inverter input.

7. The system of claim 5, wherein said first DC/DC output and said second DC/DC output are connected in parallel before coupling to said inverter input.

8. The system of claim 5, wherein
   said first AC optimizer further comprises the filter,
   said first DC/DC converter is a first step-down DC-to-DC converter,
   said second DC/DC converter is a second step-down DC-to-DC converter, and
   said first DC/DC output and said second DC/DC output are connected in series to share said filter before coupling to said inverter input.

9. A method for configuring a system comprising:
   connecting a plurality of first DC sources to a first AC optimizer comprising a plurality of first DC inputs and a first AC output, each of said first DC inputs being connected to a respective one of said first DC sources, wherein the first AC optimizer comprises a first DC/DC converter between a first DC input and the first AC output, a second DC/DC converter between a second DC input and the first AC output, a filter, and an inverter, and wherein the first DC/DC converter and the second DC/DC converter are connected in series to share the filter before coupled to an input of the inverter;
   through a circuit, performing independent maximum power point tracking (MPPT) for each of said respective first DC sources connected to said first DC inputs;
   connecting a plurality of second DC sources to a second AC optimizer comprising a plurality of second DC inputs and a second AC output, each of said second DC inputs being connected to a respective one of said second DC sources;
   through the circuit, performing independent maximum power point tracking (MPPT) for each of said respective second DC sources connected to said second DC inputs to extract power from each of said second DC sources; and
   coupling optimized AC power from said first AC optimizer and said second AC optimizer connected in series to an AC grid through a system controller, wherein each of said first AC optimizer and said second AC optimizer is a multiple-input single-output optimizer, and the system controller includes two switches.

10. The method of claim 9, wherein at least one of said plurality of first and second DC sources comprises a PV module.

11. The method of claim 9, wherein at least one of said plurality of first and second DC sources comprises a PV sub-module cell string.

12. An AC optimizer comprising:
a plurality of DC inputs, each of said DC inputs connecting to one DC source of a plurality of DC sources,
a circuit performing independent maximum power point tracking (MPPT) for each of said DC sources connected to said DC inputs to extract power from each of said DC sources and generate an AC voltage; and
an AC output outputting said AC voltage,
wherein said circuit further comprises:
a filter;
a first step-down DC/DC converter comprising a first DC/DC input and a first DC/DC output, at least one of said DC inputs coupled with said first DC/DC input;
a second step-down DC/DC converter comprising a second DC/DC input and a second DC/DC output, at least another of said DC inputs coupled with said second DC/DC input; and
an inverter comprising an inverter input coupled to said first DC/DC output and said second DC/DC output, and an inverter output connected to said AC output, and
wherein said first DC/DC output and said second DC/DC output are connected in series to share said filter before coupling to said inverter input.

13. The AC optimizer of claim 12, wherein said plurality of DC sources comprises a plurality of PV modules.

14. The AC optimizer of claim 12, wherein said plurality of DC sources comprises a plurality of PV sub-module cell strings.

15. The AC optimizer of claim 12, wherein said filter is an LC filter.

16. The AC optimizer of claim 12, wherein the AC optimizer is connected to an AC grid through a system controller.

17. The AC optimizer of claim 12, wherein the inverter is a full bridge inverter.

* * * * *